(12) United States Patent
Wisniewski et al.

(10) Patent No.: US 9,358,697 B2
(45) Date of Patent: Jun. 7, 2016

(54) NON-VISIBLE TEAR SEAMS FOR AIRBAG COVERINGS

(71) Applicant: Faurecia Interior Systems, Inc., Auburn Hills, MI (US)

(72) Inventors: Aaron Wisniewski, Plymouth, MI (US); Mathew Barr, Clarkston, MI (US); Brian Jacobs, Auburn Hills, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 66 days.

(21) Appl. No.: 14/365,672

(22) PCT Filed: Nov. 21, 2012

(86) PCT No.: PCT/US2012/066290
§ 371 (c)(1),
(2) Date: Jun. 16, 2014

(87) PCT Pub. No.: WO2013/089994
PCT Pub. Date: Jun. 20, 2013

(65) Prior Publication Data
US 2015/0001834 A1    Jan. 1, 2015

Related U.S. Application Data

(60) Provisional application No. 61/576,106, filed on Dec. 15, 2011.

(51) Int. Cl.
| | |
|---|---|
| *B60R 21/16* | (2006.01) |
| *B26F 1/24* | (2006.01) |
| *B29C 59/00* | (2006.01) |
| *B60R 21/2165* | (2011.01) |
| *B60R 13/02* | (2006.01) |

(52) U.S. Cl.
CPC ............ *B26F 1/24* (2013.01); *B29C 59/007* (2013.01); *B60R 13/02* (2013.01); *B60R 21/2165* (2013.01); *Y10T 29/49622* (2015.01)

(58) Field of Classification Search
CPC ............ B60R 21/20; B60R 21/2165; B60R 2021/21652; B60R 2021/21654
USPC ................ 280/728.3, 728.1, 728.2
See application file for complete search history.

(56) References Cited

U.S. PATENT DOCUMENTS 5,372,379 A * 12/1994 Parker ............... B60R 21/216
                                                165/41
8,573,632 B1 * 11/2013 Barr ................... B60R 21/2165
                                                280/728.3

(Continued)

FOREIGN PATENT DOCUMENTS

| DE | 4411283 C1 | 5/1995 |
|---|---|---|
| DE | 19930754 A1 | 1/2000 |
| EP | 0586222 A2 | 3/1994 |
| EP | 1213193 A1 | 6/2002 |
| EP | 1403148 A2 | 3/2004 |
| EP | 1623883 A1 | 2/2006 |
| FR | 2875762 A1 | 3/2006 |

OTHER PUBLICATIONS

International Search Report for application No. PCT/US2012/066290, dated Mar. 22, 2013, 3 pages.
Written Opinion for application No. PCT/US2012/066290, dated Mar. 22, 2013, 7 pages.

*Primary Examiner* — Toan To
(74) *Attorney, Agent, or Firm* — Reising Ethington P.C.

(57) ABSTRACT

A vehicle interior panel includes a decorative covering with a non-visible tear seam that forms a deployment opening through the covering during airbag deployment. The tear seam is formed by mechanical piercing of a skin layer of the covering from the decorative side. The skin layer is formed from a self-healing material, allowing a piercing tool to form microholes that are smaller than the effective piercing diameter of the tool without the need for subsequent processes intended to otherwise hide the formed tear seam. Tear seams formed in this manner can offer larger processing windows, lower manufacturing and equipment cost, and/or shorter cycle times when compared to other methods such as laser scoring. Tear seam function may also be improved and/or more predictable.

20 Claims, 3 Drawing Sheets

(56) References Cited

U.S. PATENT DOCUMENTS

| | | | |
|---|---|---|---|
| 2004/0056454 A1* | 3/2004 | Schwark | B60R 21/2165 280/728.3 |
| 2004/0056455 A1* | 3/2004 | Nishijima | B32B 27/32 280/728.3 |
| 2004/0119268 A1* | 6/2004 | Davis, Jr. | B60R 21/2165 280/728.3 |
| 2004/0164531 A1* | 8/2004 | Riha | B23K 26/4055 280/732 |
| 2009/0136735 A1* | 5/2009 | Bianchi | B29C 44/086 428/304.4 |
| 2012/0139213 A1* | 6/2012 | Iseman | B60R 21/2165 280/728.3 |
| 2013/0065041 A1* | 3/2013 | Wisniewski | B60R 21/2165 428/304.4 |

* cited by examiner

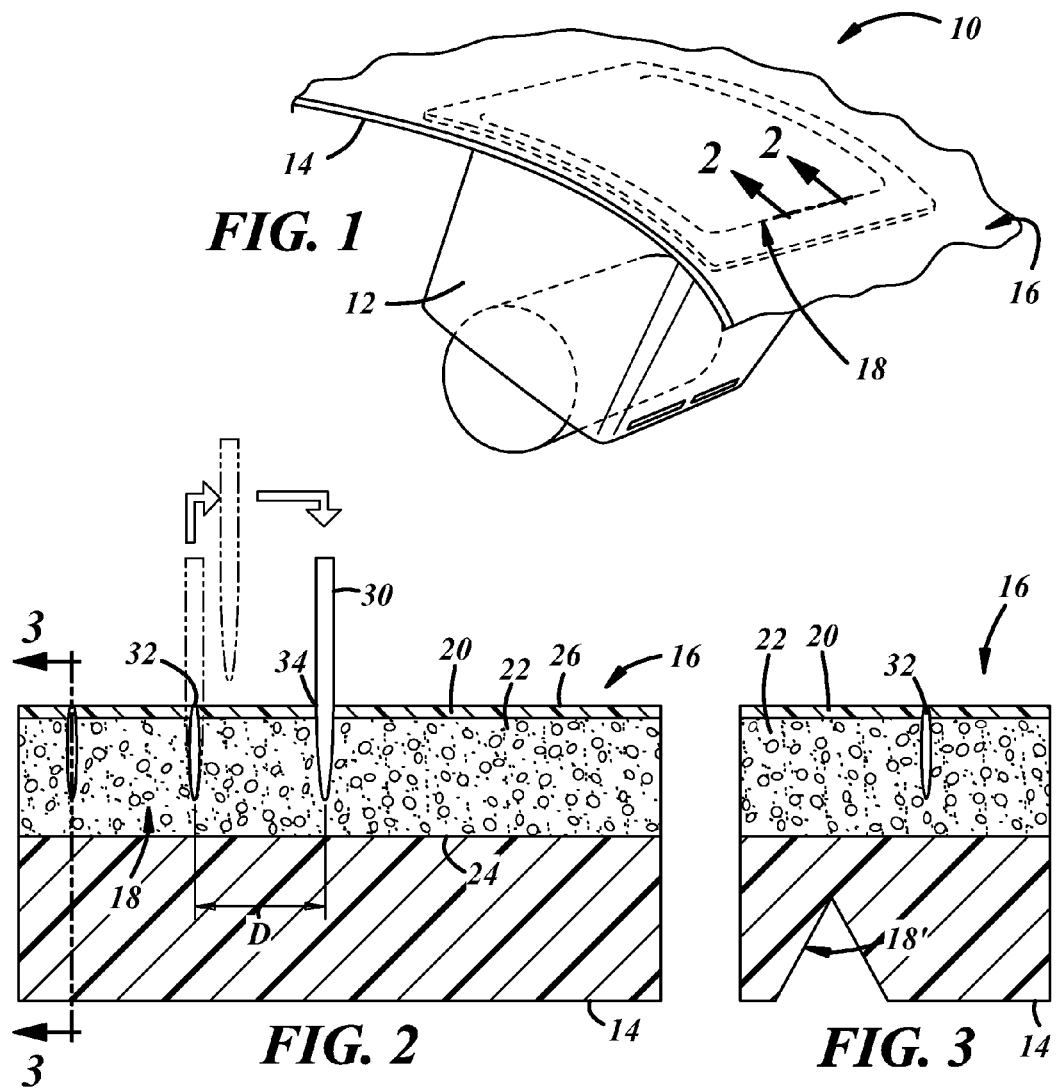
FIG. 1
FIG. 2
FIG. 3
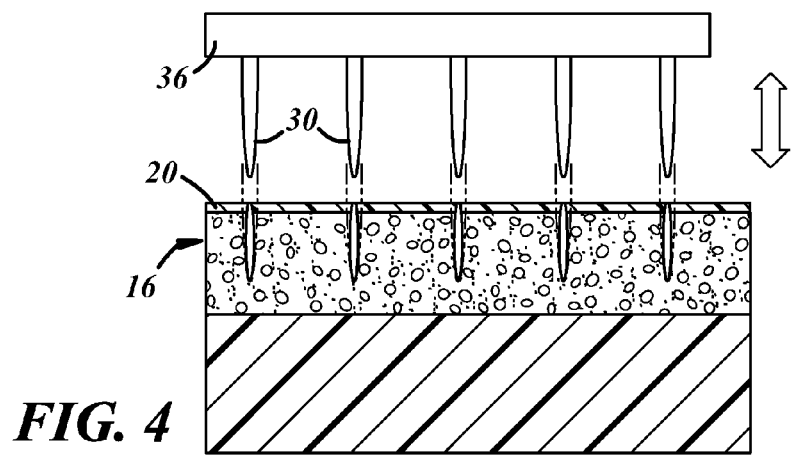
FIG. 4

NON-VISIBLE TEAR SEAMS FOR AIRBAG COVERINGS

TECHNICAL FIELD

The present disclosure relates generally to vehicle interior panels and coverings having tear seams for use over airbags.

BACKGROUND

Vehicle airbags are safety devices that deploy toward the interior of a vehicle to help protect its occupants from injury in the event of a crash. Airbags may be concealed behind or beneath an interior panel during normal vehicle operation until such an event. When the airbag deploys, it typically does so through a deployment opening formed in or around the interior panel. The deployment opening may be pre-formed in the panel, the panel may move away to reveal the opening, or the opening may be formed during airbag deployment at a pre-determined location in the panel. Where formed during deployment, a tear seam may be provided in one or more components of the panel to at least partly define the location of the opening.

German patent DE 4411283 to Stückle et al. describes one method of forming a tear seam that includes stitching an outer foil to hold the outer foil in place over the airbag. The needle used to apply the stitching perforates the outer foil along a groove or ditch in the outer foil to form a visible, stitched tear line. The foil is heated along the stitched tear line to shrink the perforations, and then cooled rapidly.

SUMMARY

In accordance with one embodiment, a method of making a vehicle interior panel having a non-visible airbag tear seam includes the steps of: (a) providing a decorative covering having a self-healing skin layer; (b) disposing the covering over a substrate to at least partly form the panel, the substrate having a pre-determined airbag deployment opening location; and (c) mechanically piercing the self-healing skin layer to form microholes at a plurality of spaced apart locations corresponding to the airbag deployment opening location. The piercing is performed from a decorative side of the covering and a non-visible tear seam comprising the microholes is formed in the covering.

In another embodiment, each microhole is formed by piercing the skin layer using a piercing tool having an effective piercing diameter that is at least about twice the effective diameter of the formed microhole.

In another embodiment, the spacing between adjacent microholes at one portion of the tear seam is larger than the spacing between adjacent microholes at another portion of the tear seam.

In another embodiment, at least some of the microholes include cross-sectional shapes with stress directors.

In another embodiment, at least some of the spaced apart locations are less than 3 mm apart.

In another embodiment, each of the microholes is formed at a different time from the other microholes.

In another embodiment, each of the microholes is formed by a single needle.

In another embodiment, step (c) is performed after step (b).

In another embodiment, step (c) is performed before step (b).

In another embodiment, step (c) comprises the steps of: (1) moving a piercing tool toward the covering in a direction substantially normal to an outer surface of the covering at least until it passes through the skin layer; (2) moving the piercing tool in the opposite direction substantially normal to the outer surface of the covering at least until the piercing tool is completely withdrawn from the covering; (3) indexing the piercing tool to another of the spaced apart locations; and (4) repeating steps (1) and (2).

In accordance with another embodiment, a panel for use over a vehicle airbag includes a substrate having a pre-determined airbag deployment opening location and a decorative covering disposed over the substrate. The decorative covering has a skin layer formed from a self-healing material. The panel further includes a tear seam formed in the decorative covering over the airbag deployment opening location. The tear seam includes a plurality of microholes formed through the skin layer, and the plurality of microholes has an average effective diameter of less than about 0.25 mm.

In another embodiment, the skin layer is formed from a material having an elongation at break of 200% or more.

In another embodiment, the skin layer includes an outer surface and a grain pattern formed in the outer surface.

In another embodiment, the decorative covering includes an inner layer located between the substrate and the skin layer, and the skin layer is formed from a thermoplastic olefin material.

In another embodiment, the panel is a vehicle instrument panel.

Within the scope of this application it is envisaged that the various aspects, embodiments, examples, features and alternatives set forth in the preceding paragraphs, in the claims and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more embodiments will hereinafter be described in conjunction with the appended drawings, wherein like designations denote like elements, and wherein:

FIG. 1 is a cutaway view of an instrument panel with a non-visible tear seam arranged over an airbag module;

FIG. 2 is a cross-sectional view of a vehicle interior panel, showing a tear seam being formed by a mechanical piercing process from the decorative side of a covering, according to one embodiment;

FIG. 3 is a cross-sectional view of the vehicle interior panel of FIG. 2, additionally showing a tear seam formed in the substrate;

FIG. 4 is a cross-sectional view of a vehicle interior panel, showing a tear seam being formed by another mechanical piercing process from the decorative side of the covering;

DETAILED DESCRIPTION OF EMBODIMENT(S)

Figure 5:
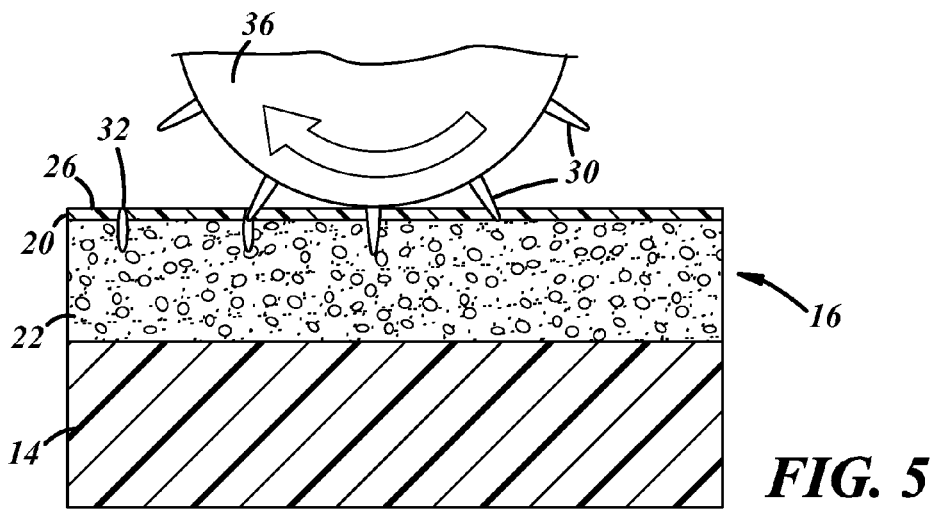
FIG. 5 is a cross-sectional view of a vehicle interior panel, showing a tear seam being formed by yet another mechanical piercing process from the decorative side of the covering.

As will be apparent from the following disclosure, non-visible tear seams may be formed in airbag coverings from the decorative side by mechanical piercing methods. In certain applications, tear seams formed in this manner can offer larger processing windows, lower manufacturing and equipment cost, and/or shorter cycle times when compared to other methods such as laser scoring. Tear seam function may also be improved and/or more predictable in some cases. Self-healing materials may be used in covering skin layers to allow piercing tools to form microholes that are smaller than the effective piercing diameter of the tools without the need for subsequent processes intended to otherwise hide the formed tear seam. It is noted that the appended drawings are not necessarily to scale and that any cross-hatching shown is provided for clarity in distinguishing among different components and is not meant to limit the types of materials that may be used for each component.

Referring now to FIG. 1, a cut-away view of an illustrative vehicle interior panel 10 is shown with an airbag module 12 installed therebeneath. Panel 10 includes one or more layers of materials, and each layer may include its own separately weakened portion or tear seam for the formation of airbag deployment openings in each layer that can together form a deployment opening through the overall panel. The portion of panel 10 shown in the figure is the passenger side of an instrument panel and includes substrate 14, covering 16, and tear seam 18. Tear seam 18 is a non-visible tear seam in this example. The particular tear seam 18 shown is generally U-shaped, but may assume other shapes, such as a rectangle, H-shape, or X-shape, to name a few examples. A vehicle passenger side airbag is used only as an example of one type of airbag that may benefit from the following disclosure, and any type of panel for use over a vehicle airbag can be made or used in accordance with these teachings.

The tear seam 18 generally includes a weakened portion of the panel 10 and/or its individual layers. The weakened portion is often arranged along a line or path that at least partly defines the location of the airbag deployment opening. For example, in the panel 10 of FIG. 1, the U-shaped tear seam 18 corresponds to three sides of a rectangular deployment opening that is formed through the panel 10 when the force of the airbag breaches one or more panel layers during deployment. The opening is formed at the tear seam 18 because of the local weakening. As used herein, "weakening" is a term of art that also refers to stress-concentration. That is to say that the panel materials along the tear seam 18 are not necessarily of lower strength than in other areas of the panel—rather that tear seams are sometimes formed by localized thickness reduction in panel materials, which effectively concentrates stress at the reduced thickness portion when airbag forces are applied. Airbag deployment openings may also be determined in part by a pre-formed opening in the substrate 14.

FIG. 2 is a cross-section of a vehicle interior panel taken along a tear seam that is shown during a mechanical piercing process, according to one embodiment. Covering 16 overlies substrate 14 to at least partly form the panel 10, though the panel may include other components not shown. The covering 16 may be disposed over the substrate either before or after the piercing process is performed, or piercing processes may be performed both before and after the covering is disposed over the substrate. Substrate 14 may provide the basic shape and/or support structure for panel 10 and can be constructed from nearly any material or combination of materials, including metals, plastics, or composite type materials such as reinforced or filled thermoplastic materials. Polypropylene or other olefin-based plastics having 15-30% glass fiber reinforcement are examples of suitable substrate materials. The substrate 14 may have an airbag deployment opening formed therethrough, an airbag door at least partly defined by a slot formed through and along the substrate in the desired shape, or a weakened portion that acts as a tear seam to form the deployment opening. FIG. 3 shows an example of panel 10 where the substrate 14 includes its own tear seam 18' in the form of a notch-like groove. Such a groove may be molded-in, milled, knife cut, laser cut, or otherwise formed in the substrate, and may be continuous or discontinuous. For example, laser scoring may be used to form a tear seam in the substrate, where the tear seam comprises a plurality of laser cuts or holes at least partially through the substrate.

Covering 16 may provide a desired aesthetic for the vehicle interior and includes one or more layers of materials. In the embodiment of FIG. 2, the covering 16 has a bilayer construction and includes skin layer 20 overlying inner layer 22. The skin layer 20 can provide the panel 10 with the desired appearance and tactile feel, and the inner layer 22 can enhance the tactile feel of the panel by providing a cushion-like effect. The skin layer 20 may be constructed from any of a variety of materials, some of which will be described below in conjunction with the description of tear seam forming processes. Layer 20 may range in thickness from about 0.3 mm to about 1.5 mm. Inner layer 22 may be a polymeric foam material such as polypropylene foam or other olefin-based foam. In one embodiment, the thickness of the inner layer 22 range anywhere from 0.5 mm to 5.0 mm depending on the desired amount of cushioning or other factors. Inner layer 22 can also be made from other types of foam materials, felt, batting, spacer fabric, or natural or synthetic textile materials, for example. Layers 20 and 22 can serve other functions as well, and additional layers of material may be included in covering 16, such as additional padding, foam, adhesive, or surface finish layers. In one embodiment, the skin layer 20 alone is the covering. The covering 16 includes opposite inner and outer surfaces 24 and 26 and may be attached to the underlying substrate by any suitable method, such as adhesive attachment, lamination, or wrapping the covering around substrate edges for attachment to an underside of the substrate. In some embodiments, the inner layer 22 may be up to 5 mm, up to 10 mm, or up to 25 mm thick. For instance, the panel 10 may include a slush molded skin layer 20 with a foam inner layer 22 that is formed in place by filling a space between the skin layer and substrate with an expandable foam composition.

It has been found that certain combinations of covering materials can provide a particularly luxurious look and feel to vehicle interiors. But some of these combinations can be difficult to implement in vehicle interior panels over airbag modules, particularly where non-visible tear seams are desired. For example, coverings having relative thin skin layers combined with relatively low density polymer foam inner layers can provide desirable aesthetics, but are difficult for use with many tear seam forming processes. Conventionally, when it is desired to make a tear seam non-visible, the tear seam is formed in and from the non-visible side of the covering—i.e., the side facing the substrate. But relatively thin skin layers leave little room for process variation when trying to control the residual wall thickness during laser or other types of scoring techniques. And lower density foam layers can be burned away or locally lose their cellular structure more than is necessary or desirable in tear seam forming processes where heat, laser light, or other thermal energy is part of the process. Some techniques have been devised to hide or mask tear seams with other visual elements at the decorative side of the covering. But such techniques, such as including sewn stitches through the covering along the tear seam or forming a visual groove in the outer surface of the covering along the tear seam are, by their very nature, visible indicators of a tear seam. Such tear seams are not considered non-visible for purposes of this disclosure.

Referring again to FIG. 2, a non-visible tear seam 18 may be formed in panel 10 by mechanically piercing the skin layer 20 at a plurality of spaced apart locations along a line or path that corresponds to the pre-determined location of the airbag deployment opening. In the illustrated embodiment, piercing tool 30 is a needle or needle-like tool that pierces the skin layer 20 from the decorative side of the covering 16 by moving in a direction toward the outer surface 26 of the covering 16 until it passes through the skin layer 20. Piercing tool 30 may continue in the same direction through the skin layer 20 and at least partially into the inner layer 22 as shown, but this is not always necessary. In some embodiments the piercing tool 30 may continue in the same direction until it reaches or passes through the inner surface 24 of the covering, which is the inner surface of the inner layer 22 in FIG. 3. After reaching the desired depth, the tool 30 is withdrawn from the covering 16 in the opposite direction and can index to the next piercing location along the covering to pierce the skin layer 20 again. In one embodiment, the process is similar to a sewing process without thread, where the covering 16 is advanced beneath an oscillating needle to form the tear seam. In other embodiments, a robot or other numerically controlled equipment may be used to allow for more process customization, as discussed below. In some cases, it may be preferred that the needle or tool 30 is oriented perpendicular to the outer surface 26, that the tool passes through the skin layer 20 in a direction generally normal to the outer surface, and that the tool is completely withdrawn from the covering 16 by moving in the opposite direction before being indexed to the next piercing location. Ensuring that the tool 30 is completely withdrawn from the covering 16 before moving the tool to the next piercing location can help to minimize unwanted enlargement of the just-formed hole.

While piercing the skin layer 20 from the visible side of the covering 16 may be an unconventional method of forming a non-visible tear seam (i.e., the piercing results in a series of holes in the visible outer surface of the covering), certain process and material parameters may be controlled to make the resulting tear seam 18 a non-visible tear seam. For example, the size of the holes and/or the spacing between adjacent holes may have an effect on the visibility of the finished tear seam. In one embodiment, the holes through the skin layer are in the form of microholes 32. A microhole is a hole with an effective diameter or other characteristic size that is small enough to be visually undetectable. The value for such a hole size may vary depending on factors such as the color of the skin, the roughness of the outer surface 26, or other factors. It has been found that holes with an effective diameter of about 0.3 mm or less are sufficiently small to be undetectable at normal vehicle interior viewing distances in a typical skin layer material. But, as already noted, this threshold value may vary, and smaller holes are generally less visible than larger ones.

Another factor that may affect overall tear seam visibility is the spacing D between adjacent holes. For example, there may be a threshold value for D below which the tear seam becomes visually perceptible even if the individual microholes are not. Holes spaced too closely may result in stress concentration in the skin material between adjacent holes that is high enough to cause visual distortion in the skin layer, which may show as a faint witness line along the tear seam. This is the same type of stress concentration that promotes proper tear seam function. Thus, smaller hole spacing D promotes better tear seam function, and larger hole spacing D promotes tear seam non-visibility. It has been found that hole spacing D of about 1.0 mm or more is sufficient between adjacent microholes 32 to form a non-visible tear seam. In some cases, the hole spacing D can be as low as 0.5 mm between adjacent microholes and result in a non-visible tear seam. This is lower than the hole spacing typically required with laser scoring to avoid tear seam visibility, particularly with coverings having foam inner layers. This may be partly because the mechanical piercing described herein does not remove any substantial amount of material from the covering 16. Smaller values for D are possible, and values of 3.0 mm or more have been found to allow proper tear seam function. As with hole size, the threshold values for D will vary depending on other factors such as the type of material used in the individual covering layers.

The hole spacing D and/or the hole size may be varied from hole to hole. For example, one portion of the tear seam may include hole spacing D that is lower than the hole spacing at a different portion of the tear seam. This can effectively control the stress distribution along the tear seam during airbag deployment. For instance, where it is desired to cause the covering to tear in a particular direction along the tear seam during airbag deployment, the hole spacing can be varied from lower values to higher values in the desired direction. Likewise, hole size can be varied from lower values to higher values in the desired tearing direction, as long as both the hole size and spacing are together sufficient to make the tear seam non-visible. In one embodiment, the tear seam comprises a plurality of microholes, and the plurality of microholes has an average width or effective diameter of about 0.25 mm or less and a hole spacing that ranges from about 1.0 mm to about 3.0 mm. In another embodiment, the tear seam includes a plurality of microholes with effective diameters or widths in a range from about 0.1 mm to about 0.3 mm. In yet another particular embodiment, the plurality of microholes has an average effective diameter or width that is in a range from about 0.15 mm to about 0.25 mm. The effective diameter may be determined for a non-circular hole by determining the area of the hole, setting the area equal to the area of a circle, and then using the equation for the area of a circle to find the effective diameter.

Tear seam visibility may also be affected by the presence or absence of a grain pattern or other texture formed in the outer surface 26 of the skin layer 20. Such patterns or textures are sometimes formed in polymeric skin layers to simulate leather or otherwise enhance the panel aesthetic and can be formed during skin layer manufacturing by calendaring, or can be formed by in-mold graining techniques during subsequent processes, for example. The somewhat random pattern that is typical with vehicle interior grain patterns can have the effect of making pierced holes less visible in the skin layer. This camouflaging effect of a grain pattern or texture may be due to light reflection by the texture in multiple random directions, shadows from the three-dimensional features in the texture, location of some of the holes in grooves of the texture, or other types of visual blending. While such a texture is not necessarily able to change large visible holes to non-visible holes, it may promote use of the higher range of sizes for microholes discussed above, which can improve tear seam function and broaden the piercing process window. The average grain or texture peak-to-valley depth may range anywhere from about 75 µm to about 175 µm.

Piercing microholes through a skin layer by mechanical methods can pose certain challenges. In particular, the piercing tool must be sufficiently small in cross-section to form non-visible holes. In a manufacturing environment, the high speeds and high number of cycles that the piercing tool must endure in day-to-day operation are not conducive to such small tooling. Smaller piercing tools are more likely to break, bend, or have short fatigue lives than larger piercing tools, if tools having such small cross-sections are sufficiently strong to pierce the particular skin layer material in the first place. In one embodiment, the skin layer 20 may be formed from a self-healing material. A self-healing skin layer can allow the use of a piercing tool with an effective piercing diameter or width 34 that is larger than the microhole that it forms. For a needle-like piercing tool 30 with a round cross-section, such as that shown in FIG. 2, the effective piercing diameter 34 is the diameter of the tool 30 at the outer surface 26 of the covering 16 when the tool 30 is at its maximum depth in the covering 16 during the piercing operation.

A self-healing skin layer is a skin layer that has sufficient elastic properties to result in a hole that is about 50% or less in effective diameter or width than the effective piercing diameter of the tool. In other words, when the piercing tool is withdrawn from the self-healing skin layer of a covering, the resulting hole—which is exactly the same as the effective piercing diameter while the tool is in place through the skin layer—shrinks to half that size or less with no additional process required to cause the shrinking. For example, a piercing tool with an effective piercing diameter of 0.5 mm results in a microhole that is about 0.25 mm or less in effective diameter when it pierces a self-healing skin layer. Self-healing skin layers may act to shrink a pierced hole by more than 50%, as well. Some self-healing materials result in microholes that are, on average, about one-third or less the size of the effective piercing diameter of the tool. Yet others result in pierced microholes with effective diameters or widths that are only 20% or less of the effective piercing diameter or width. In one embodiment, the self-healing skin layer results in microholes that range in size from about 15% to about 40% of the effective piercing diameter. In one specific embodiment, the piercing tool has an effective piercing diameter of about 0.75 mm, and the self-healing skin layer includes only microholes when pierced thereby. In another specific embodiment, the self-healing skin layer includes holes ranging in effective diameter from about 0.1 to about 0.3 mm when pierced by a tool with an effective piercing diameter of about 0.75 mm. Other exemplary piercing tools have effective diameters ranging from 0.2 mm to 0.5 mm, 0.2 mm to 0.75 mm, and 0.4 to 0.75 mm, all of which can successfully form microholes with self-healing materials.

While self-healing materials may be characterized by the above-described dimensional relationships, they may have other identifying properties as well. For example, materials with sufficient elastic properties (i.e., "memory") to be considered self-healing typically have a large elastic or pseudo-elastic strain region. In terms of polymeric materials, elastomers typically are self-healing materials, including thermoplastic elastomers. Certain elastomer-modified polymer blends may also be considered self-healing. For example, olefin-based polymer blends with EPDM or other elastomeric content may be referred to as thermoplastic olefins (TPOs) and may be self-healing materials. Of course, not all TPOs or elastomer-containing polymer blends are self-healing. Suitable self-healing materials may be identified at least in part by their exceptionally high elongation at break—a commonly measured polymer material property. In one embodiment, the self-healing material has an elongation at break of about 200% or higher. In another embodiment, the self-healing material has an elongation at break of about 300% or higher. Some self-healing materials, including some suitable TPO skin layer materials, have an elongation at break of 500% or more, and up to 800% or 1200% in some cases. Other non-TPO skin layers may be self-healing as well and/or have elongations at break of 200% or higher, including certain PUR, PVC, or PVC alloy materials, for example. In one embodiment, the skin layer is formed from a self-healing TPO material that is at least partially cross-linked. Suitable skin layers are available from O'Sullivan Films (Winchester, Va., USA) under the OL and/or OS family of materials.

The use of high elongation materials to form self-healing skin layers for airbag coverings and thus enable mechanical piercing to form microholes may also effectively broaden the range of possible materials that can be used over airbags. For example, in certain applications, highly flexible/high elongation materials such as certain TPO materials may be desirable because they feel soft, and therefore luxurious, to the touch, especially where the skin layer is relatively thin. However, such high elongation materials can be problematic for use in airbag coverings because high elongation generally hinders tear seam function (i.e., the skin layer may stretch too far before breaking, or not break at all).

Conventional means for dealing with this difficulty typically include forming the non-visible tear seam from the non-decorative side of the covering so that the covering has a residual wall thickness at the tear seam that is lower than is normal for materials without such high elongation. In other words, the higher the material elongation, the thinner the skin layer has to be at the tear seam for the skin layer to tear properly during airbag deployment. These very low residual wall thicknesses, especially with such flexible materials, can lead to visual defects such as read-through and can shrink the typical tear seam process window significantly. Employing the methods described herein to form tear seams from the decorative side of the covering not only allows the use of higher elongation materials in the skin layer—it actually encourages the use of higher elongation materials to promote self-healing for the piercing process. Skilled artisans will understand, of course, that elongation at break cannot alone be used to select a self-healing material for use in covering skin layers, as other material properties that make the material suitable as a skin layer (e.g., stiffness, hardness, flexibility, processability, weatherability, etc.) must be considered as well.

Turning now to FIG. 4, another embodiment of a mechanical piercing process is shown. In this embodiment, more than one microhole is formed at the same time and/or in the same piercing cycle. A plurality of piercing tools 30 may be attached or otherwise extend from a common tool block 36 and used to pierce the skin layer 20. This type of piercing configuration can significantly reduce the process cycle time. The tool block 36 includes two or more piercing tools 30, and may include several more as shown. In one embodiment, the tool block includes a sufficient number of piercing tools 30 arranged in the shape of the desired tear seam so that the entire tear seam can be formed in one piercing cycle. In another embodiment, a plurality of piercing cycles are performed to formed the tear seam, but the number of piercing cycles is less than the number of microholes in the tear seam due to the formation of multiple microholes in each piercing cycle. The tool block 36 need not be an actual block shape as shown, and not all of the piercing tools 30 have to be arranged to contact the skin layer 20 at the same time. In one embodiment, the individual piercing tools 30 extend from the block 36 by different amounts so that they contact the skin layer 20 at different times during tool block movement toward the covering 16 to avoid the need for excessive piercing forces. In other embodiments (such as that shown in FIG. 2) each of the holes is formed by a single needle or piercing tool that moves from location to location to form each hole individually.

FIG. 5 illustrates another embodiment of a mechanical piercing process being performed from the decorative side of the covering. In this embodiment, a plurality of piercing tools 30 extends radially from a rotary tool block 36'. Rotary block 36' rolls along and/or over the outer surface 26 of the covering 16, piercing the skin layer 20 along the way to form the tear seam with a plurality of microholes 32. The individual piercing tools 30 may be somewhat shorter than those in the embodiments of FIGS. 2 and 4 to allow each individual tool 30 to contact the outer surface 26 of the covering 16 at an angle sufficient to pierce the skin layer 20. Of course, any embodiment may include piercing tools 30 that are only sufficiently long to pierce the skin layer and not continue into the inner layer 22. These and other embodiments of the mechanical piercing process may of course include additional steps, or one or more steps could be omitted in certain cases. For example, the skin layer can be heated after piercing to further reduce the size of the microholes if desired, even though it is unnecessary with proper material and process parameter selection as described above.

Figure 6:
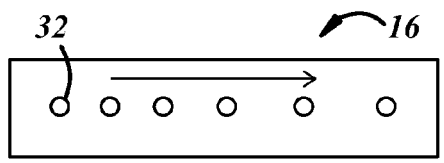
FIG. 6 is a plan view of a portion of a decorative covering with a tear seam comprising microholes with variable spacing between adjacent holes.

FIGS. 6-9 are plan views of the outer surfaces of decorative coverings 16 showing tear seam portions, where each illustrated portion has differently configured microholes 32 shaped and/or arranged to promote tearing of the skin layer in a particular direction. FIG. 6 shows a tear seam including a plurality of round microholes 32, such as may be formed using a needle or needle-like piercing tool with a circular cross-section. In this embodiment, the hole spacing is varied along the tear seam to concentrate stresses during airbag deployment at the portion of the tear seam with smaller hole spacing and cause the skin layer to tear in the direction indicated (left-to-right in the figure).

Figure 7:
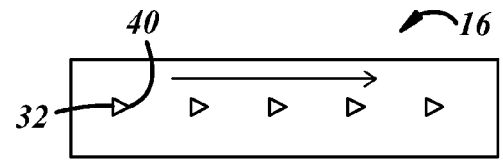
FIGS. 7-9 are each plan views of portions of decorative coverings showing tear seams comprising microholes of different cross-sectional shapes, each including stress directors.
Figure 8:
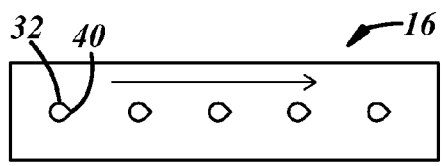
Figure 9:
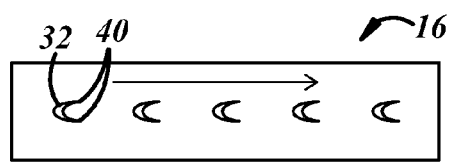

The microholes 32 shown in FIGS. 7-9 each include stress directors 40 so that, when airbag force is applied thereneath, the stresses at each microhole 32 are concentrated at the side with the stress directors, causing the respective skin layers to tear in the directions indicated. The microholes 32 of FIG. 7 have triangular cross-sections, the microholes 32 of FIG. 8 have droplet-shaped cross-sections, and the microholes 32 of FIG. 9 have crescent-shaped cross-sections. These are of course non-limiting examples presented to illustrate the manner in which such stress directors 40 function.

Figure 10:
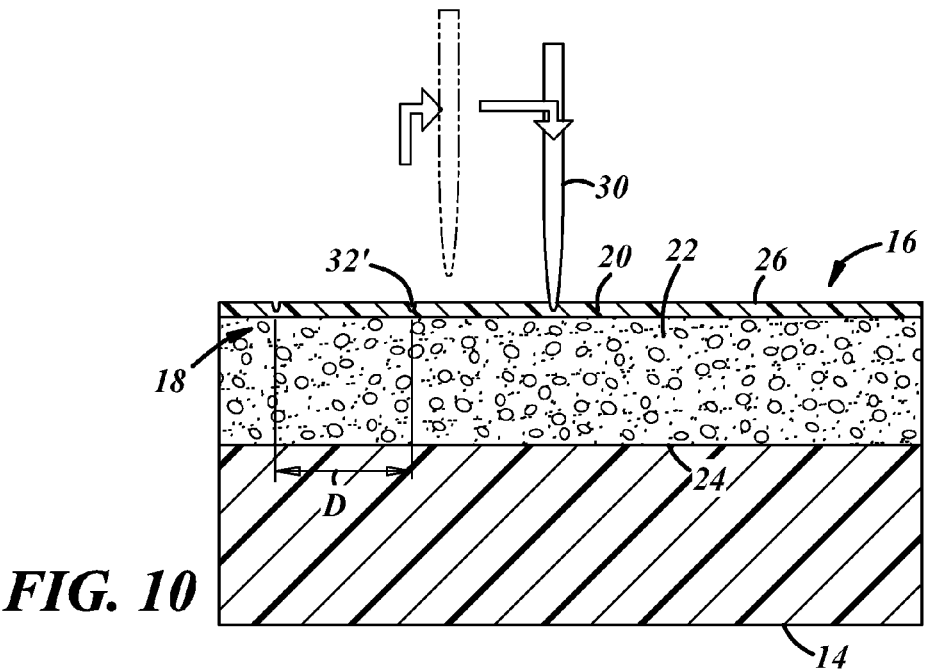
FIG. 10 is a cross-sectional view of a vehicle interior panel, showing a tear seam comprising a plurality of microdents being formed from the decorative side of the covering.

In another embodiment, shown in FIG. 10, the piercing tool only partly penetrates the skin layer 20 so that the covering tear seam 18 comprises a plurality of microdents 32'. In other words, only the outer surface 26 of the skin layer 20 is considered to be pierced rather than the skin layer as a whole. Microdents 32' may be characterized by their effective diameter or width along with their depth of penetration into the skin layer 20. As with microholes, microdents have an effective diameter or other characteristic size that is small enough to be visually undetectable, and similar other factors (e.g., color, grain, etc.) besides size can affect their visibility. An effective diameter of about 0.3 mm or less at the outer surface 26 of the skin layer is sufficiently small to be undetectable at normal vehicle interior viewing distances in a typical skin layer material, but this threshold value may vary.

A microdent 32' is at least about 0.15 mm deep, but may vary depending on overall skin layer 20 thickness. For example, a 0.3 mm skin layer may include 0.15 mm deep microdents 32', but thicker skin layers may have deeper microdents that range anywhere from about 0.15 mm to about 0.15 mm less than the total skin layer thickness. In one particular example, the tear seam 18 includes a plurality of microdents 32' formed in a skin layer 20 that is about 0.5 mm thick, and the microdents have a depth in a range from about 0.15 mm to about 0.35 mm. In another example, the skin layer 20 is about 1.0 mm thick, and the microdents 32' have a depth in a range from about 0.15 mm to about 0.85 mm, and preferably from about 0.5 mm to about 0.85 mm. Microdents 32' may be used with any combination of one or more of the above-described characteristics of the skin layer and/or skin layer material as well, such as self-healing materials, high-elongation materials, etc. However, microdents 32' may be formed in other types of skin layers. In fact, microdents 32' may be formed by non-mechanical means such as laser cutting, where laser light energy is used to only partially penetrate the skin layer from the decorative side of the covering. A tear seam can include a combination of microholes and microdents, as well.

Figure 11:
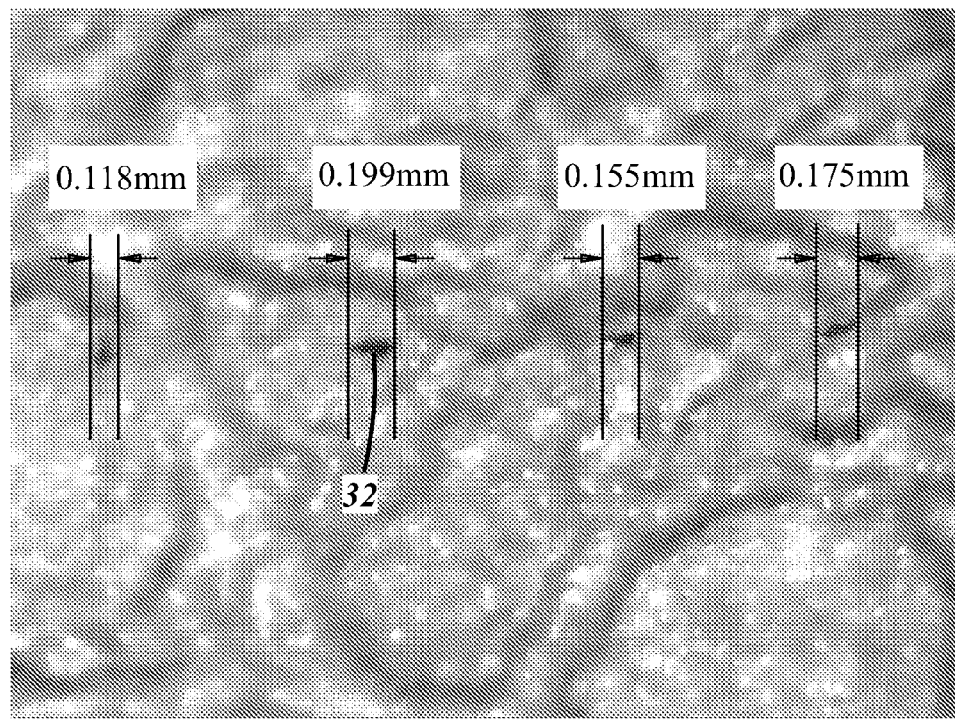
FIG. 11 is a photomicrograph of the outer surface of a sample covering with microholes formed through the skin layer.
Figure 12:
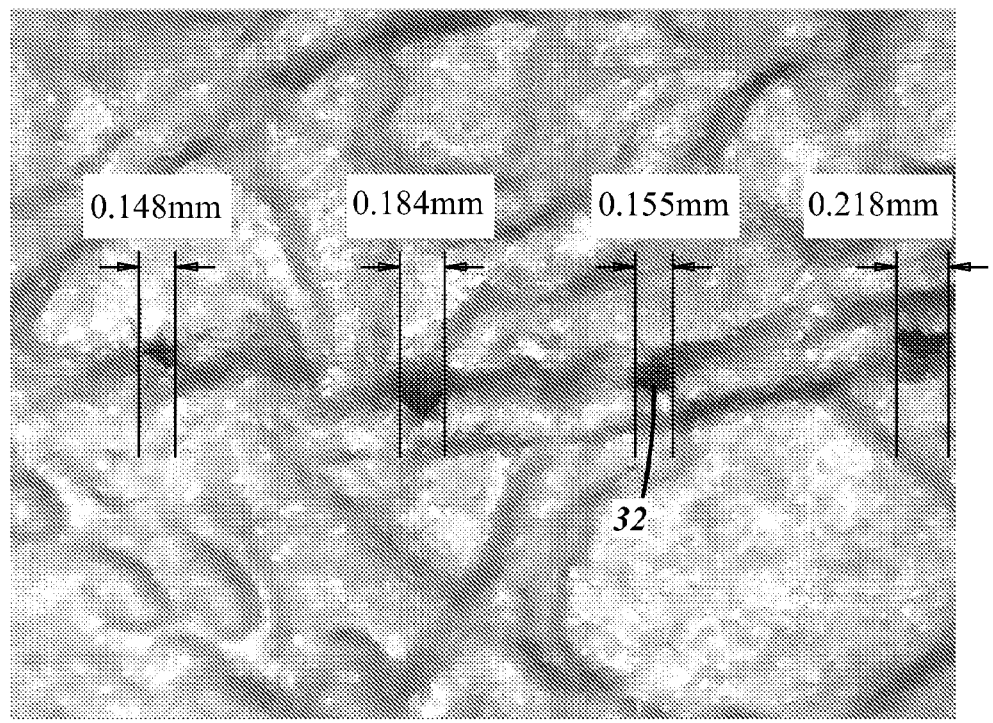
FIG. 12 is a photomicrograph of the outer surface of another sample covering with microholes formed through the skin layer, taken after xenon arc testing.

FIGS. 11 and 12 are photomicrographs of sample vehicle interior panels produced in accordance with the above methods. In particular, each of FIGS. 11 and 12 show enlarged views of the outer surfaces of the panel coverings at their respective non-visible tear seams. The example coverings each include a plurality of microholes 32 as part of the tear seam. For the portion of the tear seam shown in FIG. 11, the microholes range in size from about 0.12 mm to about 0.20 mm and are about 0.16 mm on average. These microholes were formed by mechanical piercing with a needle-like piercing tool having an effective piercing diameter of about 0.75 mm. The hole spacing D is about 1.0 mm in this example, and no additional processes were performed on the sample panel or covering to change the size of the microholes after piercing. In this example, there is a grain pattern formed in the outer surface of the covering.

For the portion of the tear seam shown in FIG. 12, the microholes range in size from about 0.15 mm to about 0.22 mm and are about 0.18 mm on average. The particular sample shown in FIG. 12 was subjected to xenon arc testing—an accelerated weathering test commonly used in the automotive industry that shines high energy artificial light on the sample surface—prior to being photographed and measured. The samples shown in FIGS. 11 and 12 are not the same sample, and the sizes of the microholes shown in FIG. 12 prior to xenon arc exposure were not measured.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of making a vehicle interior panel having a non-visible airbag tear seam, comprising the steps of:
   (a) providing a decorative covering having a self-healing skin layer;
   (b) disposing the covering over a substrate to at least partly form the panel, the substrate having a pre-determined airbag deployment opening location; and
   (c) mechanically piercing the self-healing skin layer using a piercing tool to form microholes at a plurality of spaced apart locations corresponding to the airbag deployment opening location, wherein the piercing is performed from a decorative side of the covering and a non-visible tear seam comprising the microholes is formed in the covering, each microhole being smaller than an effective piercing diameter of the piercing tool so that the tear seam is non-visible without the need for a subsequent process intended to hide the formed tear seam.

2. The method of claim 1, wherein the effective piercing diameter is at least about twice the effective diameter of each microhole.

3. The method of claim 1, wherein the spacing between adjacent microholes at one portion of the tear seam is larger than the spacing between adjacent microholes at another portion of the tear seam.

4. The method of claim 1, wherein at least some of the microholes include cross-sectional shapes with stress directors.

5. The method of claim 1, wherein at least some of the spaced apart locations are less than 3 mm apart.

6. The method of claim 1, wherein each of the microholes is formed at a different time from the other microholes.

7. The method of claim 1, wherein the piercing tool is a needle and each of the microholes is formed by the same needle.

8. The method of claim 1, wherein step (c) is performed after step (b).

9. The method of claim 1, wherein step (c) is performed before step (b).

10. The method of claim 1, wherein step (c) comprises the steps of:
    (1) moving the piercing tool toward the covering in a direction substantially normal to an outer surface of the covering at least until it passes through the skin layer;
    (2) moving the piercing tool in the opposite direction substantially normal to the outer surface of the covering at least until the piercing tool is completely withdrawn from the covering;
    (3) indexing the piercing tool to another of the spaced apart locations; and
    (4) repeating steps (1) and (2).

11. The method of claim 1, wherein the decorative covering includes an inner layer located between the substrate and the skin layer after step (b).

12. The method of claim 1, wherein the skin layer is formed from a thermoplastic olefin.

13. The method of claim 1, wherein the microholes have an average effective diameter of less than about 0.25 mm.

14. A vehicle interior panel for use over an airbag, comprising:
    a substrate having a pre-determined airbag deployment opening location;
    a decorative covering disposed over the substrate and having a skin layer formed from a self-healing material; and
    a tear seam formed in the decorative covering over the airbag deployment opening location, the tear seam comprising a plurality of microholes formed through the skin layer, wherein the plurality of microholes has an average effective diameter of less than about 0.25 mm,
    wherein the decorative covering includes an inner layer located between the substrate and the skin layer, and the skin layer is formed from a thermoplastic olefin material.

15. A vehicle interior panel as defined in claim 14, wherein the skin layer is formed from a material having an elongation at break of 200% or more.

16. A vehicle interior panel as defined in claim 14, wherein the skin layer includes an outer surface and a grain pattern formed in the outer surface.

17. A vehicle instrument panel according to claim 14.

18. A vehicle interior panel as defined in claim 14, wherein the spacing between adjacent microholes at one portion of the tear seam is larger than the spacing between adjacent microholes at another portion of the tear seam.

19. A vehicle interior panel as defined in claim 14, wherein at least some of the microholes include cross-sectional shapes with stress directors.

20. A vehicle interior panel as defined in claim 14, wherein at least some of the microholes are less than 3 mm apart.

* * * * *